E. E. THRASHER.

ATTACHER AND AUTOMATIC SEALER FOR CAMERA FILMS.

APPLICATION FILED APR. 17, 1922.

Reissued June 6, 1922.

2 SHEETS—SHEET 1.

15,377.

Inventor

E. E. Thrasher

By T. R. Bryant

Attorney

E. E. THRASHER.

ATTACHER AND AUTOMATIC SEALER FOR CAMERA FILMS.

APPLICATION FILED APR. 17, 1922.

Reissued June 6, 1922.

2 SHEETS—SHEET 2.

15,377.

Inventor

E. E. Thrasher

By T. R. Bryant

Attorney

UNITED STATES PATENT OFFICE.

ELMER E. THRASHER, OF SOUTH CUMBERLAND, MARYLAND.

ATTACHER AND AUTOMATIC SEALER FOR CAMERA FILMS.

15,377. Specification of Reissued Letters Patent. Reissued June 6, 1922.

Original No. 1,411,982, dated April 4, 1922, Serial No. 314,777, filed August 1, 1919. Application for reissue filed April 17, 1922. Serial No. 554,240½.

*To all whom it may concern:*

Be it known that I, ELMER E. THRASHER, a citizen of the United States of America, residing at South Cumberland, in the county of Allegany and State of Maryland, have invented certain new and useful Improvements in Attachers and Automatic Sealers for Camera Films, of which the following is a specification.

The usual manner of attaching the freed end of a film strip for winding when the spool as shown in Fig. 2 is initially placed in a camera, such as folding camera, is more or less inconvenient and liable to mistake on the part of an inexperienced operator and one object of my invention is the provision of a ready means for attaching the end of the film strip correctly to the winding spool without the possibility of a mistake and before the strip is unsealed thereby permitting the closing of the camera for subsequently winding the spool, automatically unsealing the strip and starting the winding operation for the successive exposure of the proper film surface portions.

In connection with the automatic unsealing of the film strip in the closed camera my invention includes a substantially reversely operating automatic initial sealing or closure retainer for the film strip after entire exposure has taken place insuring the perfect condition of the exposed film when the camera is opened and the filled spool removed for developing.

By means of my invention, the slipping and spoiling of a film is prevented as well as a foot or more of the heavy paper film winding strip saved.

With these general objects in view and that of saving expense as well as annoyance in operating the camera, my invention which is easy and inexpensive to manufacture and readily applied to any film camera having a spool winding means, the invention consists of the novel combination and arrangement of parts hereinafter more fully described, illustrated in the accompanying drawings and then claimed.

In the drawings, forming a part of this application and in which like reference characters designate corresponding parts throughout the several views,—

Figure 1:
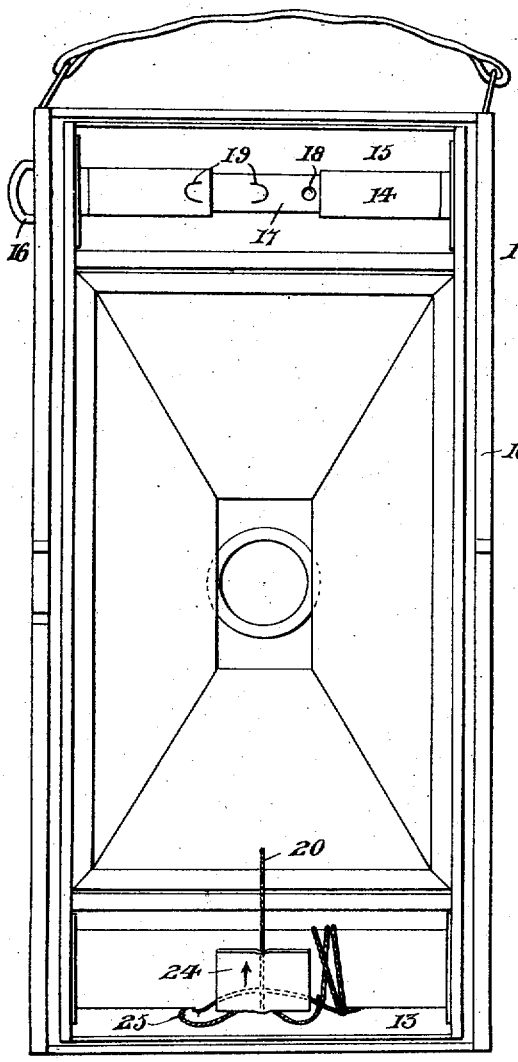
Figure 1 is a rear elevational view of a camera with the lid removed with the sealed spool of film in its proper place at the unwinding end of the camera.

My invention being serviceable in a film camera 10, herein illustrated, is employed with the long paper film strip 11 wound upon the delivery spool 12 when originally purchased, for insertion in one end portion or compartment 13 of the camera for winding upon the receiving spool 14 in the opposite end compartment 15, the winding key 16 being provided therefor.

Both of the spools 12 and 14 are provided substantially centrally with a cord-receiving groove 17 and a perforation 18 for attaching thereto one end of a cord, and anchoring ears 19 are struck up from the spool, so that either the perforation or the ears may be employed for securing the cord to the spool.

The spool of new or undeveloped film is the condition shown in Figure 1 when purchased and is positioned in the end compartment 13 in the usual manner. An unwind or pull cord 20 is secured to the outer end 21 of the strip 11 as by an overlying attaching piece or wafer 22 or by securing through perforations 23 in said end of the strip, and encircles the adhesive seal 24, is wrapped a few turns around the filled spool and passes longitudinally beneath the seal 24 with a free end portion of suitable length projecting from the seal.

Figure 3:
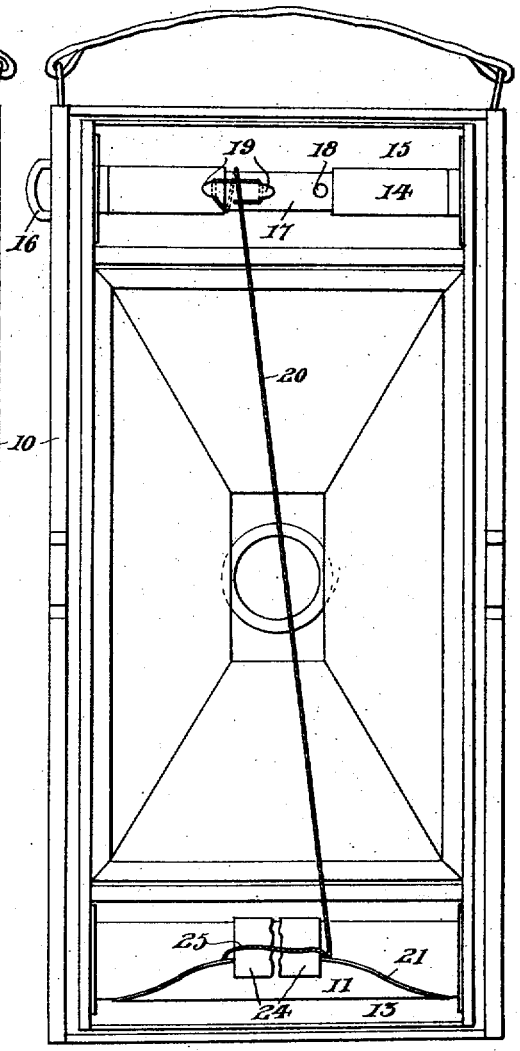
Figure 3 is a view similar to Figure 1 showing the manner of automatically breaking the seal, the lid being preferably closed duing such operation.
Figure 2:
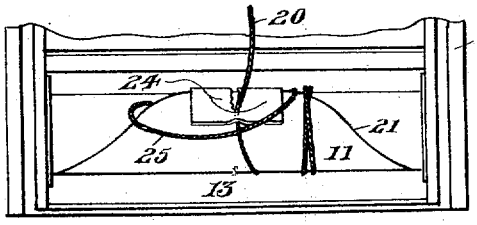
Figure 2 is a similar view of the unwinding end portion of the camera with the attaching cord partially released for securing to the winding spool at the opposite end thereof.

The cord 20 is then pulled, severing the seal 24 into two parts, which still maintain the strip 11 entirely rolled up, this operation of loosening the cord 20 being illustrated in Fig. 2. The free end of the cord 20 is then secured to the anchoring ears 19 of the receiving spool 14 unless it is desired to use the perforation 18 and the lid or cover of the camera is then closed overlying the compartments 13 and 15, the position of the cord being illustrated in Fig. 3.

Figure 4:
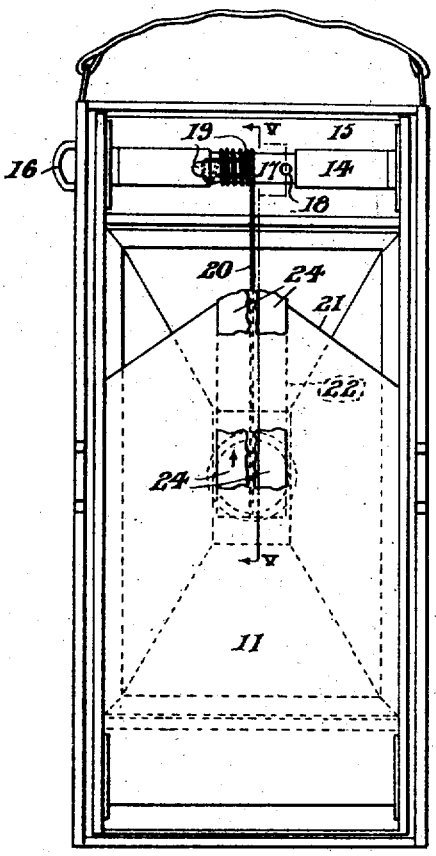
Figure 4 shows a further step in the unwinding operation after the seal is broken.

Upon turning the key 16, the spool 12 is revolved, unwinding the cord 20 from the film roll onto the groove 17 of the receiving spool 14, which operation tightens the looped portion 25 of the cord 20 upon the seal 24, finally severing or breaking the seal, pulling the end 21 of the strip 11 toward the spool 12 during the unwinding of the film for purposes of exposure as illustrated in Fig. 4.

Figure 7:
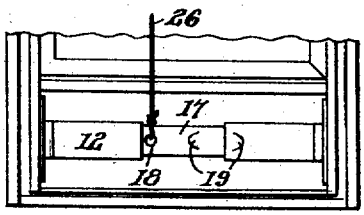
Figure 7 is an elevational view of the unwinding end of the camera showing the anchoring cord secured in one manner to the delivering spool.
Figure 8:
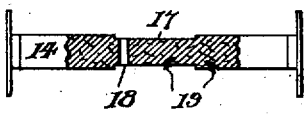
Figure 8 is an elevational view of one of the spools with the central portion illustrated in longitudinal section.
Figure 9:
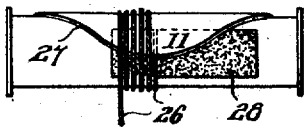
Figure 9 is an elevational view of the receiving spool with the film strip completely rolled thereon and the anchoring cord overlying the same.
Figure 10:
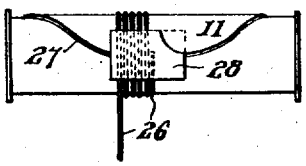
Figure 10 is an inverted view similar to Figure 9 with the adhesive strip finally closing the film roll and holding the cord in place.
Figure 5:
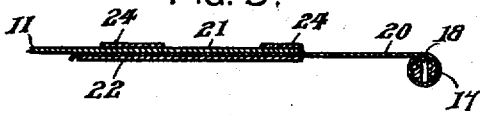
Figure 5 is a detail sectional view taken upon line V—V of Fig. 4.
Figure 6:
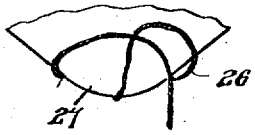
Figure 6 shows the opposite end portion of the film strip and the holding cord attached thereto.

At the completion of the picture taking operation, an anchoring or closing cord 26 attached at one end to the delivery spool 12 as shown in Fig. 7 and with its opposite end secured to the end 27 of the strip 11 opposite the end 21 thereof as shown in Fig. 6, is wound a number of turns around the rolled up film and strip 11 as shown in Fig. 9. The continued turning of the key 16 finally disconnects the closing cord 26 from the delivering spool 12 either by breaking the cord 26 or by pulling the same loose from the spool 12 when a predetermined amount of tension has been reached. The camera having been closed during all of the time since the attachment of the cord 20 to the receiving spool 14, the lid of the camera, not shown, is now removed and the filled spool 14 taken from the compartment 15 with the cord 26 closely wrapped around the strip 11, securely holding the same in closed position as shown in Fig. 9. The spool 14 may then be removed.

The usual adhesive member 28 carried by the end 27 of the strip 11 is then moistened and folded over upon itself, overlying the wrapped portion of the cord 26 and the adjacent portion of the strip end 27, maintaining the film strip 11 closed and sealed. The automatic retention of the rolled exposed strip by the cord 26 is sufficient for temporary purposes without using the adhesive member 28, the cord 26 being of any length desired to be drawn tightly and securely wrapped around the filled spool 14 by continuing the winding operation by means of the key 16. The adhesive member 28, however, may be closed or sealed before the filled spool 14 is removed from the camera, further insuring against any possible slight unwinding of the strip 11.

The grooves 17 of the spools 12 and 14 permit the winding of the cord 20 and 26 without interfering with the smooth winding of the strip 11 upon said rollers. No part of my invention in any manner impedes or retards the perfect operation of the film mechanism but is readily installed in connection with the usual winding spools and protecting strips saving both expense in production as well as time and expense to the consumer. While the form of the invention set forth herein is believed preferable, it will be understood that minor changes may be made therein without departing from the spirit and scope of my invention, and that the attaching and seal breaking means operable from the receiving roller may be used with or separately from the final closing means above described.

What I claim as new is—

1. A roll film comprising a spool, a film strip wound on the spool, a seal normally closing the free beginning end of the film strip, a pull cord secured at one end to said end of the strip and having portions thereof looped around a part of the seal and extending beneath the remainder of the seal, whereby the unwinding of the cord is adapted to automatically break the seal.

2. A roll film comprising a spool, a film strip wound thereon, a seal normally overlying the free end of the strip when in its original wound position, and a pull cord secured at one end to said free end of the strip with the intermediate portion of the cord encircling said seal and the free end portion of the cord secured beneath the seal adapted for pulling prior to the unwinding operation.

3. A roll film comprising a spool, a film strip wound thereon, a cord attached at one end adjacent the inner or final end of the film strip and at its other end to the delivery spool of the camera, the cord being adapted for automatic winding around the re-wound strip and a subsequent automatic detachment of the cord from the delivery spool.

4. A roll film comprising a spool, a film strip wound on the spool, a seal normally closing the free end of the film strip, and a cord secured at one end to the free end of the film strip and wound thereon in a manner to have a looped portion disposed beneath the seal with the free side of the loops disposed outwardly of the seal, said cord being further wound on the film roll with the outer end secured beneath the seal above the looped portion whereby the cord in being attached to a receiving spool will break a portion of the seal without releasing the film strip and permit the cord wound on the roll being unwound therefrom prior to the breaking of the seal by the looped portion to permit the unwinding of the film strip.

5. A roll film comprising a spool, a film strip wound on the spool, a seal normally closing the free end of the film strip, and a cord secured to the free end of the film strip, said cord being wound on the film roll and having portions disposed beneath and above the seal whereby initial pulling of the cord will partially break the seal to permit the cord being wound on a receiving spool, and a further pull on the cord will sever the seal to permit unwinding of the film strip.

6. A roll film comprising a spool, a film strip wound on the spool, a seal normally closing the free end of the film strip, and a cord secured to the free end of the film strip, said cord being wound on the film roll in the same direction of winding as the film strip and having portions disposed beneath and above the seal whereby initial pulling of the cord will partially break the seal to permit the cord being wound on a receiving spool, and a further pull on the cord will sever the seal to permit unwinding of the film strip.

7. A roll film comprising a spool, a film strip wound on the spool, a seal closing the free end of the film strip, and a cord secured to the free end of the film strip, and wound on the film roll in a manner to have one side of a looped portion disposed beneath the seal with the outer end of the cord further wound on the film roll with the terminal end disposed beneath the seal and extending above the looped portion beneath the seal whereby pulling the terminal end of the cord will sever a portion of the seal without releasing the film strip to permit the winding of the cord on a receiving spool, and a further pull upon the cord will cause the looped portion thereof to sever the seal to permit unwinding of the film strip.

8. A roll film comprising a spool, a film strip wound on the spool, a seal normally closing the free end of the film strip, and a cord secured to the free end of the film strip, said cord being wound on the film roll and having portions disposed beneath and above the seal whereby initial pulling of the cord will partially break the seal, and a further pull on the cord will sever the seal to permit unwinding of the film strip, a cord attached at one end adjacent the inner or final end of the film strip and at its other end to said spool, the cord being adapted for automatic winding around the rewound film strip and for a subsequent automatic detachment of the cord from the spool.

9. A roll film comprising a spool, a film strip wound on the spool, a seal normally closing the free end of the film strip, a cord secured to the free end of the film strip, said cord being wound on the film roll and having portions disposed beneath and above the seal whereby initial pulling of the cord will partially break the seal, and a further pull on the cord will sever the seal to permit unwinding of the film strip, a cord attached at one end adjacent the inner or final end of the film strip and at its other end to said spool, the cord being adapted for automatic winding around the rewound film strip and for a subsequent automatic detachment of the cord from the spool, and a seal carried by the final end of the film strip adapted to be moved to a position overlying the wound end of the last named cord for retaining the roll in a tightly wound condition.

10. A roll film comprising a spool, a film strip wound on the spool, a seal normally closing the free end of the film strip, and a cord secured to the free end of the film strip, said cord being wound on the film roll and having portions disposed beneath and above the seal whereby initial pulling of the cord will partially break the seal, and a further pull on the cord will sever the seal to permit unwinding of the film strip, said spool having a peripheral depressed portion, cord-attaching means associated with said spool and depressed portion, a cord attached at one end adjacent the inner or final end of the film strip and detachably connected at its other end to said cord-attaching means, the cord being adapted for automatic winding around the rewound film strip and for a subsequent automatic detachment from the spool.

In testimony whereof I affix my signature.

ELMER E. THRASHER.